US012725816B2

(12) United States Patent
Ancimer et al.

(10) Patent No.: US 12,725,816 B2
(45) Date of Patent: Sep. 1, 2026

(54) ASSESSING HEALTH OF A FUEL STACK USING FUEL CELL VOLTAGE DIAGNOSTICS

(71) Applicants: CUMMINS INC., Columbus, IN (US); HYDROGENICS CORPORATION, Mississauga (CA)

(72) Inventors: Richard J. Ancimer, Toronto (CA); Paolo Forte, Maple (CA); Justin Roberto Rizzi, Oshawa (CA); Prabhsimran Malhi, Brampton (CA); Sumit Tripathi, Columbus, IN (US); Eero Teene, Hamilton (CA); Ashok Kumar, Columbus, IN (US)

(73) Assignee: HYDROGENICS CORPORATION, Mississauga (CA)

( * ) Notice: Subject to any disclaimer, the term of this patent is extended or adjusted under 35 U.S.C. 154(b) by 661 days.

(21) Appl. No.: 18/189,450

(22) Filed: Mar. 24, 2023

(65) Prior Publication Data

US 2023/0327154 A1 Oct. 12, 2023

Related U.S. Application Data

(60) Provisional application No. 63/328,138, filed on Apr. 6, 2022.

(51) Int. Cl.
*H01M 8/04664* (2016.01)
*H01M 8/04537* (2016.01)

(52) U.S. Cl.
CPC ... *H01M 8/04679* (2013.01); *H01M 8/04559* (2013.01)

(58) Field of Classification Search
CPC .......... H01M 8/04559; H01M 8/04679; Y02E 60/50
See application file for complete search history.

(56) References Cited

U.S. PATENT DOCUMENTS

2008/0050619 A1* 2/2008 Lai .................... H01M 8/04291 429/492
2010/0015474 A1* 1/2010 Dinan ............... H01M 8/04559 429/432
2014/0272652 A1* 9/2014 Lebzelter .......... H01M 8/04574 429/431
2014/0377685 A1* 12/2014 Hong .................. H01M 4/8814 429/492
2016/0144719 A1* 5/2016 Ryu ........................ B60L 15/20 701/22
2022/0106060 A1* 4/2022 Morrison ............ H01M 8/0438
2023/0095116 A1* 3/2023 Lee ................... H01M 8/04089 429/444

FOREIGN PATENT DOCUMENTS

CA 3032388 A1 * 2/2018 ......... C08G 73/0616

* cited by examiner

*Primary Examiner* — Victoria H Lynch
(74) *Attorney, Agent, or Firm* — Barnes & Thornburg LLP

(57) ABSTRACT

The present disclosure generally relates to systems and methods for assessing the health of a fuel cell stack including collecting fuel cell stack operating data by a controller including stack voltage data and cell voltage monitoring data and determining the trust in the collected data, processing stack voltage data and cell voltage monitoring data by the controller to identify bad channels and weak cells amongst fuel cells included in the fuel cell stack, tracking the state of health of the fuel cell stack by the controller, and assessing the health of the fuel cell stack by the controller.

20 Claims, 6 Drawing Sheets

50
28
24
22
26
32
30
44
44
CURRENT FLOW
42
42
12, 20
34
40
34

10
12, 20
18
14
14
14

ASSESSING HEALTH OF A FUEL STACK USING FUEL CELL VOLTAGE DIAGNOSTICS

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/328,138 filed on Apr. 6, 2022, the entire disclosure of which is hereby expressly incorporated herein by reference.

TECHNICAL FIELD

The present disclosure relates to systems and methods for assessing the health of a fuel cell stack based on fuel cell voltage diagnostics.

BACKGROUND

Vehicles and/or powertrains use fuel cells or fuel cell stacks for their power needs. A fuel cell and fuel cell stack may include, but are not limited to a phosphoric acid fuel cell (PAFC), a molten carbonate fuel cell (MCFC), a proton exchange membrane fuel cell, also called a polymer exchange membrane fuel cell (PEMFC), or a solid oxide fuel cell (SOFC).

A fuel cell or fuel cell stack may generate electricity in the form of direct current (DC) from electro-chemical reactions that take place in the fuel cell or fuel cell stack. A fuel processor converts fuel into a form usable by the fuel cell or fuel cell stack. If the fuel cell or fuel cell stack is powered by a hydrogen-rich, conventional fuel, such as methanol, gasoline, diesel, or gasified coal, a reformer may convert hydrocarbons into a gas mixture of hydrogen and carbon compounds, or reformate.

A fuel cell stack typically includes many fuel cells. Monitoring the voltage of fuel cells in the fuel cell stacks can provide valuable diagnostic information. For example, monitoring and detecting a minimum cell voltage may indicated that the operating state of the fuel cell stack is causing the low voltage, and a blower or recirculation pump can be used to increase the voltage. However, it is difficult to distinguish a bad channel that provides a low signal for voltage detection from a 'weak cell' that is unable to produce high voltage.

Significant architectural changes are being introduced in the next generation of fuel cell systems including using fuel cell stacks that can function at a wider range of pressure and temperature operating states, and designing complex control systems for air handling, fuel management, and for managing the relationship between pressure and temperature. Thus, there is a need for higher fidelity diagnostics in such fuel cell systems.

The present disclosure is directed to systems and methods for evaluating and assessing health of the fuel cells and fuel cell stacks in a fuel cell system by distinguishing between bad channels and weak cells, accounting for fuel cell aging, and compensating for fuel cell system operation and measurement variability.

SUMMARY

Embodiments of the present disclosure are included to meet these and other needs.

In one aspect, the present disclosure is directed to a method of assessing health of a fuel cell stack comprising, collecting operating data from one or more fuel cells of the fuel cell stack, determining trust in the collected operating data, processing the operating data to identify a bad channel or a weak fuel cell in the fuel cell stack, wherein the bad channel is a fuel cell whose voltage cannot be accurately detected while a bad or a weak fuel cell is a fuel cell unable to produce high voltage for tracking state of health of the fuel cell stack, assessing the health of the fuel cell stack, and alerting a user about the health of the fuel cell stack.

In some embodiments, the method may further comprise identifying the bad channel by determining a difference in voltage measurements between adjacent fuel cells and comparing the difference to an average cell voltage measurement (CVM). In some embodiments, the method may further comprise identifying the bad channel based on statistics of fuel cell voltage distribution, voltage spread increase under transient conditions, assessment of individual fuel cell weakness on a continuum, identifying outliers, inner and outer interquartile range (IQR) thresholds, or behavioral signatures or patterns.

In some embodiments, the method may further comprise a controller implementing a validity check to ascertain the identification of the bad channel, wherein the validity check comprises determining that cell voltage monitor (CVM) measurements are within a range of about 0.25 V to about 1.1 V or that a difference between the CVM mean and a stack voltage measurement is about 0.02 V after excluding large outliers. The method may further comprise determining an age of a fuel cell in the fuel cell stack by an age counter.

In some embodiments, determining the age of the fuel cell in the fuel cell stack by an age counter may comprise a controller characterizing parameters that influence fuel cell aging, assessing duty cycle data or real-time data, filtering the duty cycle data or real-time data, weighting the duty cycle data or real-time data, formulating degradation functions, or estimating cumulative degradation of the fuel cell. In some embodiments, weighting the duty cycle data or real-time data may comprise the controller using a binning strategy based on steady state conditions, dry and wet cycles, or voltage cycles. In some embodiments, estimating cumulative degradation of the fuel cells may comprise the controller using transfer functions. In some embodiments, cumulative degradation of the fuel cell and the identification of the bad channel or the weak fuel cell may be an input in tracking the health of the fuel cell stack.

In some embodiments, tracking the state of health of the fuel cell stack may comprise the controller determining output performance parameters of the fuel cell stack and compensating the output performance parameters based on the fuel cell stack operating state. In some embodiments, compensating for a fuel cell stack operating state may comprise compensating for off nominal pressure occurrences while maintaining relative humidity in the fuel cell stack, compensating for temperature, or compensating for relative humidity. In some embodiments, determining the output performance parameters may comprise determining a polarization curve or inter quartile range (IQR) variance, and utilizing a binning strategy with respect to current density.

In some embodiments, assessing the health of the fuel cell stack may comprise providing a prognostic analysis based on expected values of the fuel cell stack. In some embodiments, providing the prognostic analysis may be based on a polarization curve or an IQR variance. In some embodiments, assessing the health of the fuel cell stack may comprise a controller determining the fuel cell stack to be healthy and calculating a projected rate of aging of the fuel cells in the fuel cell stack. In some embodiments, assessing the health of the fuel cell stack may comprises a controller determining the fuel cell stack to be marginally healthy and adjusting a control target to recover fuel cell stack performance or adjusting anode excess fuel ratio, cathode humidity, cathode pressure, cathode temperature, or cathode excess air ratio. In some embodiments, assessing the health of the fuel cell stack may comprise a controller determining the fuel cell stack to be degraded and regenerating the fuel cell stack.

In some embodiments, assessing the health of the fuel cell stack may comprise comparing output performance parameters determined by tracking the health of the fuel cell stack to expected values based on look-up tables, experimental data, or maps. In some embodiments, assessing the health of the fuel cell stack may comprise a controller diagnosing or compensating for the weak fuel cell or the bad channel. In some embodiments, operating data may include stack voltage data and cell voltage monitoring data.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein.

DETAILED DESCRIPTION

The present disclosure relates to systems and methods of for evaluating and assessing health of fuel cells and fuel cell stacks in a fuel cell system by distinguishing between bad channels and weak cells, accounting for fuel cell aging, and compensating for fuel cell system operation and measurement variability. The present disclosure is directed to implementing a controller to track and assess the health of the fuel cells and fuel cell stack based on fuel cell voltage diagnostics.

Figure 1A:
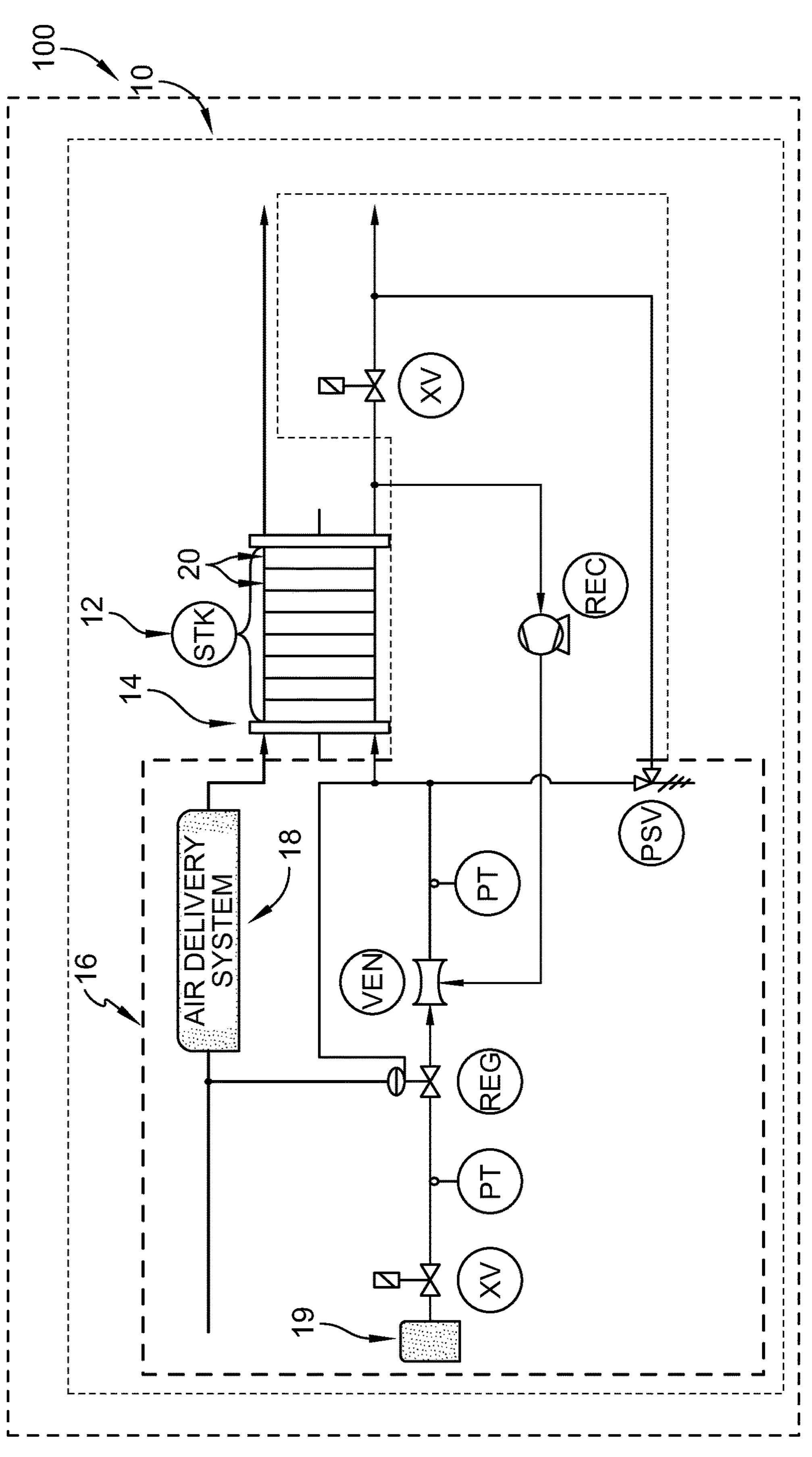
FIG. 1A is a schematic view of an exemplary fuel cell system including an air delivery system, an electrolyzer, and a fuel cell module including a stack of multiple fuel cells.
Figures 1B, 1C:
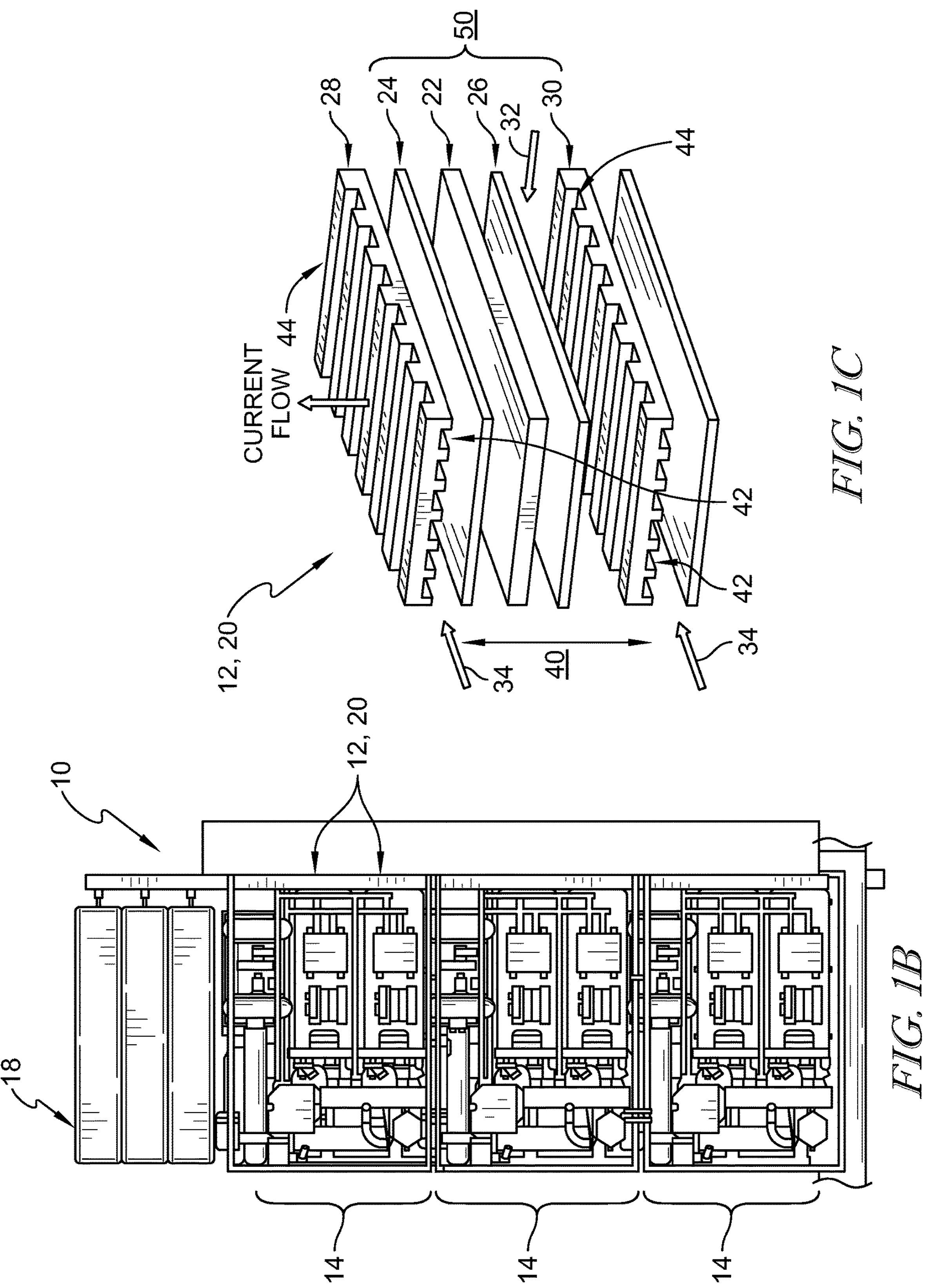
FIG. 1B is a cutaway view of an exemplary fuel cell system including an air delivery system, an electrolyzer, and a plurality of fuel cell modules each including multiple fuel cell stacks.
FIG. 1C is a perspective view of an exemplary repeating unit of a fuel cell stack of the fuel cell system of FIG. 1A.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
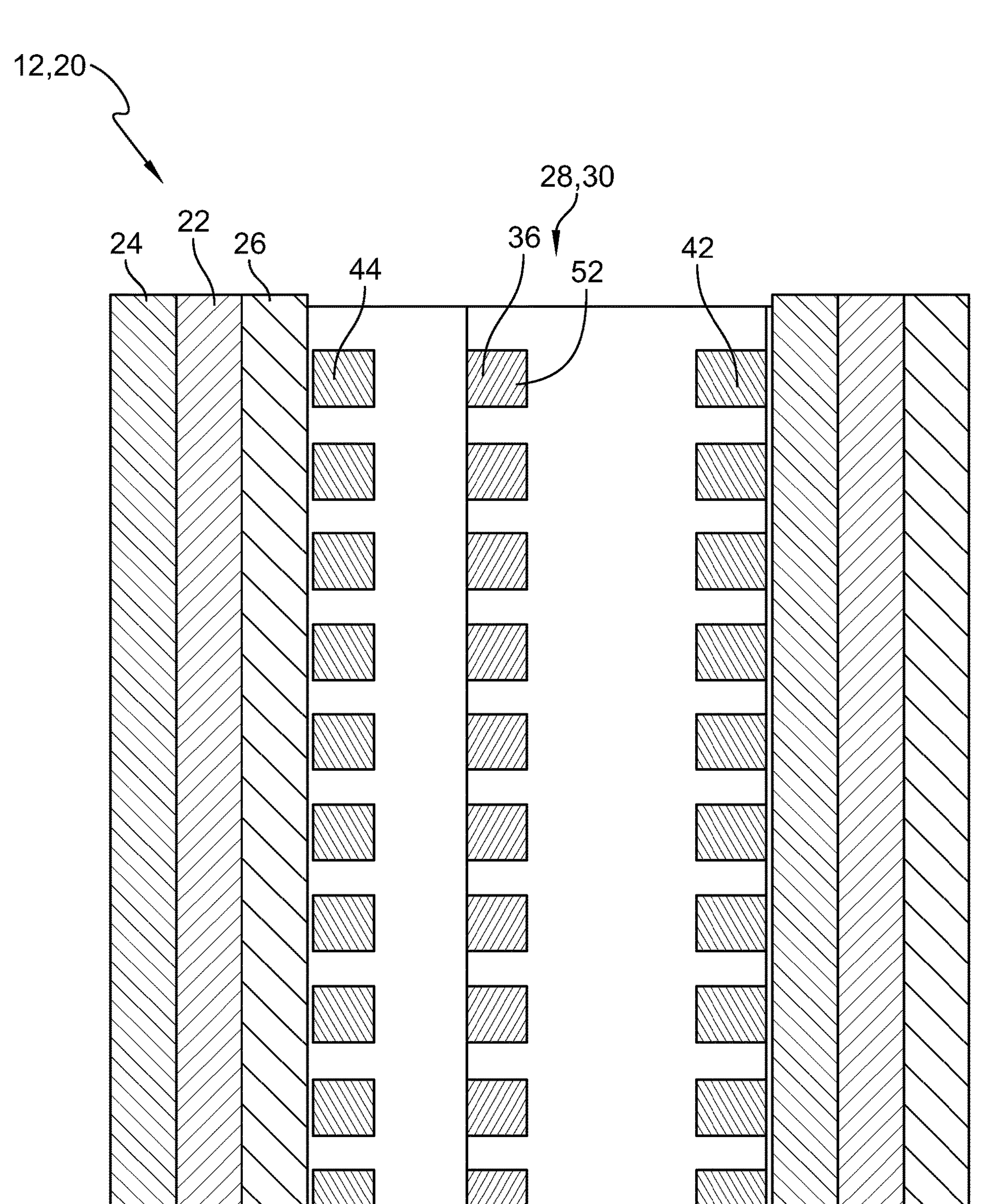
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a source of hydrogen 19 such as a pressurized tank, including a gaseous pressurized tank, cryogenic liquid storage tank, chemical storage, physical storage, stationary storage, or electrolyzers. In one embodiment, the fuel cell system 10 is connected and/or attached in series or parallel to a source of hydrogen 19, such as one or more sources of hydrogen 19 in the BOP 16 (see FIG. 1A). In another embodiment, the fuel cell system 10 is not connected and/or attached in series or parallel to a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Figure 2:
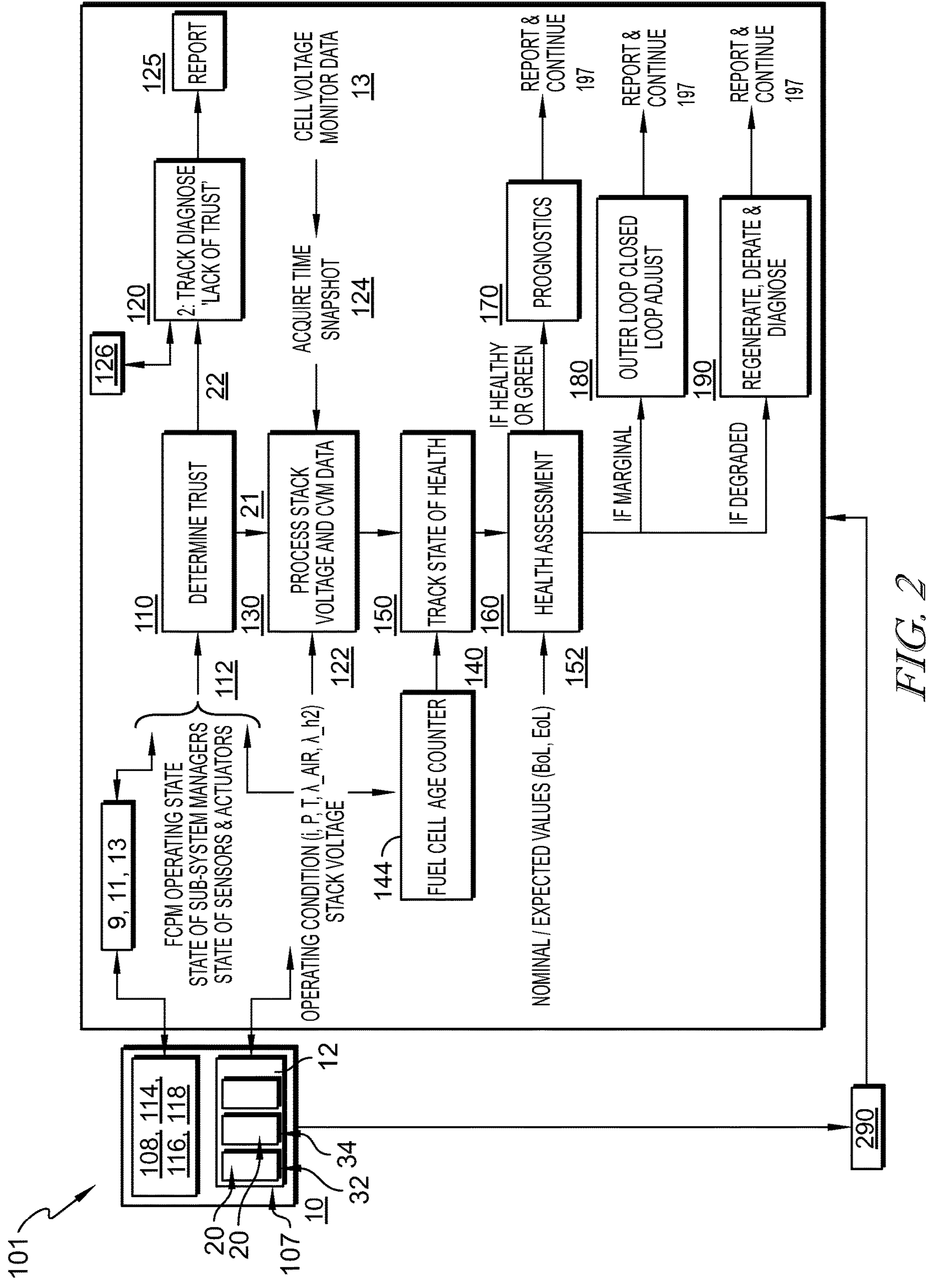
FIG. 2 is a flowchart implemented manually or automatically by a controller to diagnose the health of a fuel cell system by monitoring fuel cell stack voltage (stack voltage) or fuel cell (cell voltage)

FIG. 2 illustrates a flowchart 101 of a method embodiment that is implemented manually or automatically by a controller 290 to diagnose the health of the fuel cell system 10 by monitoring fuel cell stack 12 voltage (stack voltage) or fuel cell 20 (cell voltage). The fuel cell system 10 can include one or more fuel cell stacks 12 and each fuel cell stack 12 can include one or more fuel cells 20. A method of monitoring stack voltage or cell voltage can include monitoring voltage from each fuel cell 20 in the fuel cell stack 12 or monitoring voltage from a subset of fuel cells 20 in the fuel cell stack 12. A subset of fuel cells 20 can include every second fuel cell 20 or every third fuel cell 20 or every fourth fuel cell 20, or every fifth fuel cell 20, or every predetermined number of fuel cells 20 up to and including every fuel cell 20 in the fuel cell stack 12. The method of monitoring stack voltage or cell voltage may include several steps which may be implemented by one controller 290 or by different controllers associated with different components of the fuel cell system 10.

The method of monitoring stack voltage or cell voltage may include a step 110 of the controller 290 determining trust in the data 9 being collected. Determining trust in the data 9 refers to the act of establishing confidence in the data 9 that has been and/or is being collected to utilization in the present method or system. Determining trust in the data 9 means establishing that the data 9 is accurate and that there are no or limited errors (e.g., measurement and/or calculation errors, etc.) associated with the data 9 that would make the data unreliable and/or unfit to utilize in the present method or system. Typically, the controller 290 may determine trust of the data, as well as lack of trust of the data, based on various mechanisms and/or information as described in further detail below.

The data 9 may include many types of incoming or input data, such as stack voltage and/or cell voltage data 11. The method may further include one or more steps. For example, the method may include a step 120 of tracking or diagnosing any detection of lack of trust in the data 9, a step 130 of processing the data 9, a step 140 of determining age of the fuel cell 20, a step 150 of tracking state of health of the fuel cell stack 12, and/or a step 160 of assessing the health of the fuel cell stack 12. The method may further include steps 170, 180, 190 of evaluating assessments made in step 160.

The controller 290 may collect data 9 about the operating state of the fuel cell stack 12, about the state of any sub-systems 108 (e.g., air handling system 114, fuel management system 116, thermal management system, etc.), or about the state of sensors or actuators 118 in the fuel cell system 10. This data 9 is collected in step 112. The data 9 collected is then evaluated based on the stack voltage and the operating conditions of the fuel cell stack 12 determined in step 122.

The determination of trust in step 110 may be performed or accomplished by two different methods. The first method of determining trust in the data 9 can include the controller 290 determining the validity of data 9 based on information obtained by processing the data 9 by an external controller or processor 126. If any of the sub-systems 108, sensors, and/or actuators 118 are determined to be functioning under a 'fault status,' the controller 290 may set the data 9 collected from those components false data 23. The sub-systems 108, sensors, and/or actuators 118 are determined to be functioning under the 'fault status' when they are not functioning in a desired state or within acceptable levels of operational control. Alternatively, data 9 obtained from the sub-systems 108, sensors, and/or actuators 118 when they not functioning under the 'fault status' may be identified as trusted data 21.

Alternatively or additionally, the second method of determining trust in the data 9 in step 110 may include the controller 290 assessing the operating state of the fuel cell stack 12 and determining if the internal state of the fuel cell stack 12 is stable. In some embodiments, data 9 collected when the fuel cell stack 12 is operating at steady state may be identified as trusted data 21. Similarly, data 9 collected when the fuel cell stack 12 is operating under transient conditions may be identified as false data 23.

The method of monitoring stack voltage or cell voltage may include the controller 290 determining a transient energy threshold for voltage, current, temperature, and/or cathode outlet relative humidity measurements of the fuel cell stack 12. The transient energy threshold of the fuel cell system 10 depends on the operating conditions of the components of the fuel cell system 10, including the fuel cell stack 12 and the fuel cells 20.

The method of monitoring stack voltage or cell voltage may further includes the controller 290 assessing a transient energy of the fuel cell stack 12 and determining if the assessed transient energy is above the determined transient energy threshold. In some embodiments, this determination may be performed by applying a first order high pass filter to the collected data 9. If the assessed transient energy is above the determined transient threshold values, the method includes the controller 290 identifying the data 9 as false data 23. If the data 9 is not false (e.g., the transient energy is below the determined transient energy threshold values), the data is identified as trusted data 21. In some embodiments, this determination or assessment of the validity and/or trustworthiness of the data 9 based on the determined transient energy threshold values may include using detailed equations, look-up maps, and/or prior experimental data to ascertain the determined transient threshold values.

For example, the data 9 may preferably include infinite impulse response (IIR). A first order high pass filter may be applied to the data 9. The squared or absolute value of an output obtained after applying the first order high pass filter to the data 9 is calculated and compared to the determined transient energy threshold value. The transient energy threshold may be determined and/or calibrated by using a reference, such as a step change of a certain magnitude. The step change may be a representative of a step change in the operating state (e.g., current density) of the fuel cell stack 12. The transient threshold may be set to be the value of the output after applying the high pass filter to the data 9 when the internal state of the fuel cells 20 in the fuel cell stack 12 is stable.

Figures 3A, 3B, 3C:
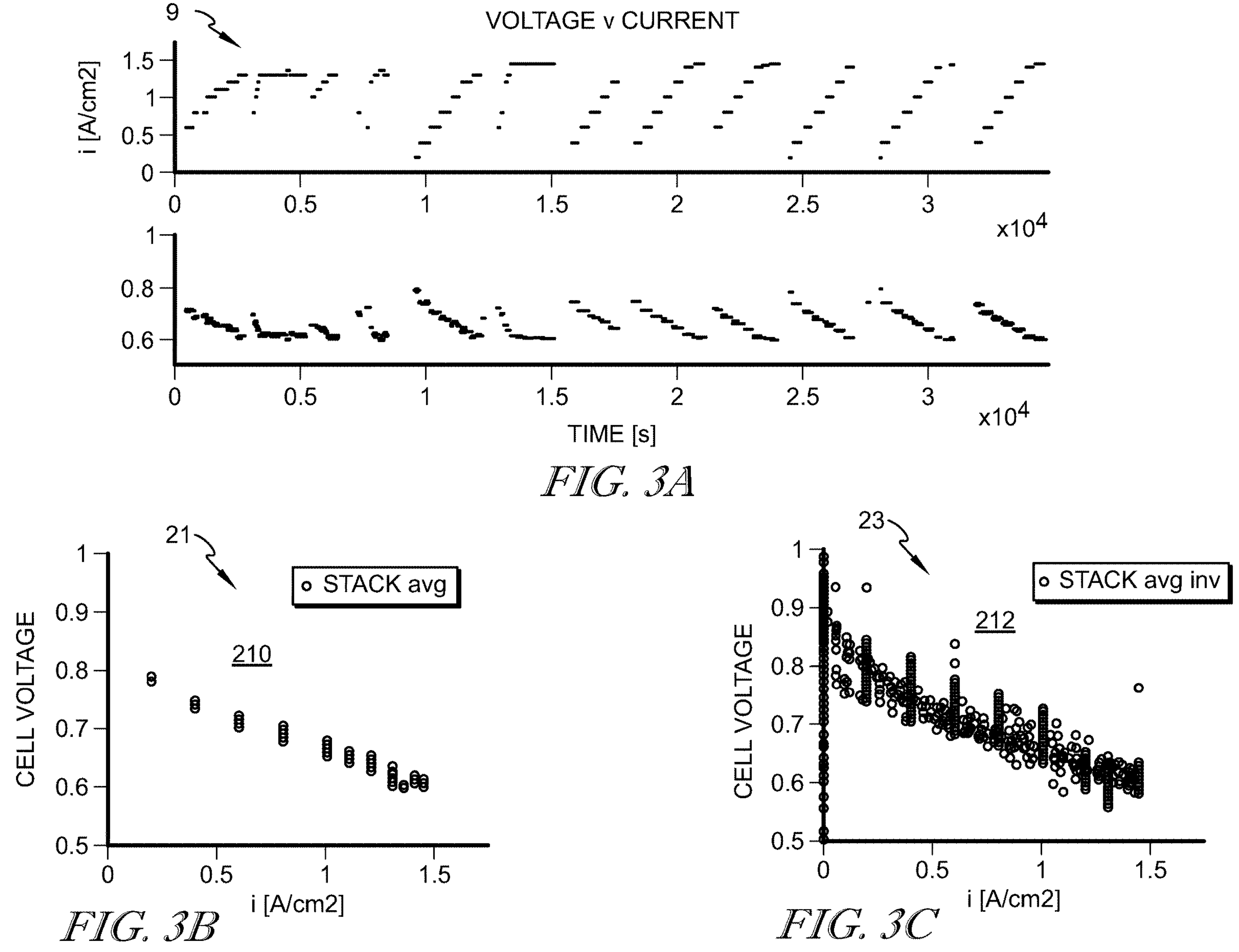
FIG. 3A illustrates cell voltage and current density as a function of time.
FIG. 3B illustrates polarization curves created with trusted data.
FIG. 3C illustrates polarization curves created with false data.

FIG. 3A illustrates data 9 comprising cell voltage and current density as a function of time. As shown in FIGS. 3B-3C, using trusted data 21 results in a narrower polarization curve 210 (FIG. 3B) than a polarization curve 212 (FIG. 3C) that uses false data 23. If the controller 290 determines that the data 9 collected is false data 23 in step 110, the method includes the controller 290 diagnosing the reason for the collection of false data 23 and producing a report or an alert 197 accordingly in step 125 (FIG. 2).

As shown in FIG. 2, data 9 may include stack voltage data 11 and/or data collected from cell voltage monitors (CVM) 13. The stack voltage data 11 and the data collected from cell voltage monitors (CVM) 13 is processed in step 130 if deemed by the controller 290 to be trusted data 21 in step 110. Time snapshots of the cell voltage monitors (CVM) 13 may be acquired in step 124. The trusted data 21 is processed intelligently and efficiently with minimum computational load.

The method of monitoring stack voltage or cell voltage includes processing the trusted data 21. Trusted data 21 may be any data and/or information related to the fuel cell 20, including but not limited to duty cycle data and/or real-time sensor and/or fuel cell data. Processing the trusted data 21 includes the controller 290 identifying one or more bad channels 132 and/or one or more bad or weak fuel cells 134 in the fuel cell stack 12. In some embodiments, all data 9 may be processed to identify one or more bad channels 132 and/or one or more bad or weak fuel cells 134 in the fuel cell stack 12. In other embodiments, only trusted data 21 may be processed to identify one or more bad channels 132 and/or one or more bad or weak fuel cells 134 in the fuel cell stack 12.

A bad or weak fuel cell 134 is an unhealthy fuel cell 20 that is unable to maintain operational power generation (e.g., electrical power) at the rate and/or duration of life specified by a manufacture of the fuel cell 20. For example, a weak or bad fuel cell 134 is a fuel cell 20 that is unable to produce a sufficient voltage to support a load (e.g., an external load, such as a vehicle, powertrain, and/or an industrial application). In some embodiments, a bad or a weak fuel cell 134 is unable to produce a high enough voltage or current to support the load.

A bad channel 132 is indicated by a low detection signal for the fuel cell 20 voltage. For example, the fuel cell 20 is identified as a bad channel if the fuel cell 20 can produce a required voltage to carry or support a load, but the voltage produced by the fuel cell 20 may not be accurately detected or measured. A bad channel 132 may indicate that the fuel cell 20 is not a bad or weak fuel cell 134. Instead, a bad channel 132 may indicate that there is some error or problem in the data 21 collected from that specific fuel cell 20, whether that is due to some problem or corruption with the data 21 itself or the data collection process.

Bad channels 132 may be identified based on behavioral signatures or patterns that may indicate incorrect, problematic, and/or inaccurate data measurement or collection. For example, a bad channel 132 may be identified by evaluating nominal spread in fuel cell 20 voltage measurements, scaling the measurements with current density by using an ohmic fraction, and identifying major outliers by using an interquartile method with hard limits. Additionally or alternatively, a bad channel 132 may be identified by determining a difference in voltage measurements between one or more adjacent fuel cells 20 and comparing the difference to an average CVM measurement 13. A bad channel 132 may be identified if the difference in voltage measurements between one or more adjacent fuel cells 20 is about 0.02 V higher or lower than the average CVM measurement 13 after excluding outliers.

Alternatively or additionally, contiguous offset fuel cells 20 may indicate that the data 9, 21 being transmitted is old, corrupt, and/or unreliable data. Such data 9, 21 may also indicate that there is a data transmission or an update issue or problem. Contiguous offset fuel cells 20 may be illustrative of an error in data collection or data measurement from consecutive fuel cells 20 that indicate a bad channel 132. This is because consecutive offset fuel cells 20 may indicate an underlying error in data measurement or collection and/or data corruption affecting more than one fuel cell 20. Thus, contiguous offset fuel cells 20 can indicate the presence of a bad channel 132. For example, if adjacent fuel cells 20 measurements are different from the average CVM measurement 13, those adjacent fuel cells 20 may be identified as bad channels 132 even if their measurement is not about 0.02 V higher or lower than the average CVM.

A validity check may be implemented by the controller 290 to determine that the assessment, determination, and/or identification of one or more bad channels 132 is accurate. The validity check may include ensuring, confirming, and/or verifying that the CVM measurements 13 are within the range of about 0.25 V to about 1.1 V, including any voltage or range of voltage comprised therein. The validity check may also include ensuring, confirming, and/or verifying that trusted data 21 is being used.

Additionally, the presence of an electronic control module (ECM) (e.g., the controller 290) may be accounted for in the identification of a bad channel 134. Utilization of the controller 290 may result in an overhead parasitic cost on the system 10. In order to account for the overhead parasitic cost of the ECM (e.g., controller 290), conditions may be established for identifying outliers and determining accurate data representation.

For example, the ECM (e.g., controller 290) may be used for calibrating a spread between fuel cell voltage measurements or determining cell voltage monitors (CVM) measurements 13 and calculating the stack voltage data 11 to represent $50^{th}$ percentile of all voltage data collected. Additionally, an outer and an inner interquartile range (IQR) may be calibrated as thresholds (e.g., an inner IQR threshold and an outer IQR threshold) for identifying outliers. Major and minor outliers may be identified by implementing a single pass algorithm through the data 21.

The interquartile range (IQR) is a measure and/or value of statistical dispersion. The inner IQR threshold can be used along with the outer IQR threshold to identify bad channels 132 in the fuel cells. For example, the outer IQR threshold can be used for identifying voltage outliers larger than the interquartile range. When a cell voltage monitor (CVM) measurement 13 is beyond the outer IQR threshold value, that particular fuel cell 20 may be identified as a bad channel 132. In contrast, the inner IQR threshold can be used for identifying voltage outliers smaller than the interquartile range. When a cell voltage monitor (CVM) measurement 13 is less the inner IQR threshold value, that particular fuel cell 20 may be identified as a bad channel 132.

The inner IQR threshold and the outer IQR threshold values may be calibratable. For example, the inner IQR threshold value can be at or about 3, and the outer IQR threshold can be at or about 6. The inner IQR threshold may be chosen to account for an expected variation (e.g., a statistical likelihood of a random variation about a mean resulting in this value being low). The inner IQR threshold can range from at or about 2 to at or about 4, including any specific value or range comprised therein. The outer IQR threshold is set to a value where a likelihood of a healthy fuel cell 20 is very low, thus indicating an unexpected variation. This unexpected variation may be indicative of a bad channel 132. The outer IQR threshold can range from 5 to about 7, including any value or range comprised therein.

The calculated difference between the inner IQR threshold and the outer IQR threshold can also be used for performing a fuel cell voltage difference calculation. This calculation of the fuel cell voltage difference can be used to determine a calculated voltage threshold to identify adjacent fuel cells 20. The voltage difference between one or more adjacent fuel cells 20 can be used to indicate if one of the adjacent fuel cells 20 is a bad channel 132. Specifically, when the voltage difference between adjacent fuel cells 20 is less than the calculated voltage threshold based on the inner IQR threshold and the outer IQR threshold, that corresponding fuel cell 20 is identified as a bad channel 132.

In some embodiments, different inner and outer IQR threshold values may be used for identifying the voltage difference between adjacent fuel cells 20. For example, the inner IQR threshold value for adjacent fuel cells 20 can range from about 1.5 to about 3, including any value or range comprised therein. The outer IQR threshold value for adjacent fuel cells 20 can range from about 4 to about 6, including any value or range comprised therein. In some embodiments, the outer IQR threshold for adjacent fuel cells 20 may be set to a value where the likelihood of having a healthy fuel cell 20 is approaches zero.

When a cell voltage monitor (CVM) measurement 13 is between the inner and outer IQR thresholds, a degree of weakness or a weakness fraction of that bad channel 132 may be assigned. This weakness fraction is a fraction of the CVM measurement relative to a distance between the inner and outer IQR thresholds. For example, if the inner IQR threshold is about 0.6 V, the outer IQR threshold is about 0.25 V, and the cell voltage monitor (CVM) measurement 13 is about 0.55 V, then the weakness fraction is:

$$\frac{0.6-0.55}{0.6-0.25}=0.14\ \text{V}$$

Additionally, identification of one or more bad channels 132 may result in the controller 290 resetting, restarting, and/or shutting down the affected fuel cell 20.

Referring back to FIG. 2, bad or weak fuel cells 134 may be identified based on analyzing and comparing individual fuel cell 20 characteristics when processing fuel cell stack voltage data 11 in step 130. These fuel cell 20 characteristics may include statistics or information regarding fuel cell voltage distribution, determining change in voltage when the fuel cell 20 is operating under transient conditions compared to steady state conditions, identifying individual fuel cell weakness on a continuum between the inner and outer IQR thresholds, and/or accounting for ECM (e.g., controller 290) overhead considerations. For example, the inner and outer IQR thresholds when the fuel cell system 10 is operating under transient conditions may be different from the inner and outer IQR thresholds when the fuel cell system 10 is operating under steady state conditions. Algorithms may be used to determine if a fuel cell voltage determined by the cell voltage monitor (CVM) measurement 13 is outside an expected nominal change in the inner and outer IQR thresholds based on ECM overhead considerations.

Age of the fuel cell 20 is determined by a global age counter 144 in step 140 in FIG. 2. The step 140 of determining age of the fuel cell 20 is further illustrated in FIG. 4 and includes the controller 290 characterizing parameters that influence fuel cell 20 aging. The method of determining age of the fuel cell 20 includes assessing trusted data 21, such as duty cycle data and/or real-time trusted data 21 in step 310. The method of determining fuel cell 20 age also includes filtering the trusted data 21 in step 312, weighting the trusted data 21 in step 314, formulating degradation functions in step 316, and/or estimating a cumulative degradation of the fuel cell 20 in step 318.

The method of determining fuel cell 20 age may further include the controller 290 using a binning strategy to bin or collect the trusted data 21 into buckets or specific categories when weighting or evaluating the trusted data 21 in step 314. The trusted data 21 may be binned and weighted based on operating conditions of the fuel cell 20. The trusted data 21 may be cumulatively weighted at high voltages (e.g., about 0.6 V or higher) when being assessed and binned according to a steady state condition. The trusted data 21 may be cumulatively weighted at high current densities (e.g., about 1.2 $mA/cm^2$ or higher) when being assessed and binned according to a steady state condition. Additionally or alternatively, the trusted data 21 may be cumulatively weighted based on dry and wet cycles of a fuel cell membrane 107, and/or voltage cycles. The relative humidity (RH) of the fuel cell system ranges from a dry or a low RH to a saturated RH (e.g., RH of about 1).

Low relative humidity thresholds may be associated with dry conditions where the water content is below about 40% to about 50% of saturated condition, including any specific range of RH comprised therein (e.g., RH of about 50%, about 40%, about 30%, about 20%, and/or about 10% or lower). High relative humidity thresholds may be associated with wet conditions where the water content rises to about 80% to about 90% of saturated condition. A number of operating transitions made by the fuel cell 20 based on a low relative humidity threshold or based on any change in relative humidity over a given time period data is determined when the trusted data 21 is being assessed and binned according to the dry and wetting cycles.

A number of operating transitions made by the fuel cell 20 based on voltage thresholds or based on any change in voltage over a given time period data is determined when the trusted data 21 is being assessed and binned based on voltage cycles. The voltage thresholds are determined based on the operating conditions of the fuel cell system 10.

Weighting functions may be used for prioritization when the trusted data 21 is being weighted in step 314. The degradation function formulated in step 316 may be physics based, semi-empirical, and/or empirical. Aging transfer functions (e.g., exponential functions) may be used to estimate the cumulative degradation impacting the age of a fuel cell 20 in step 318.

Figure 4:
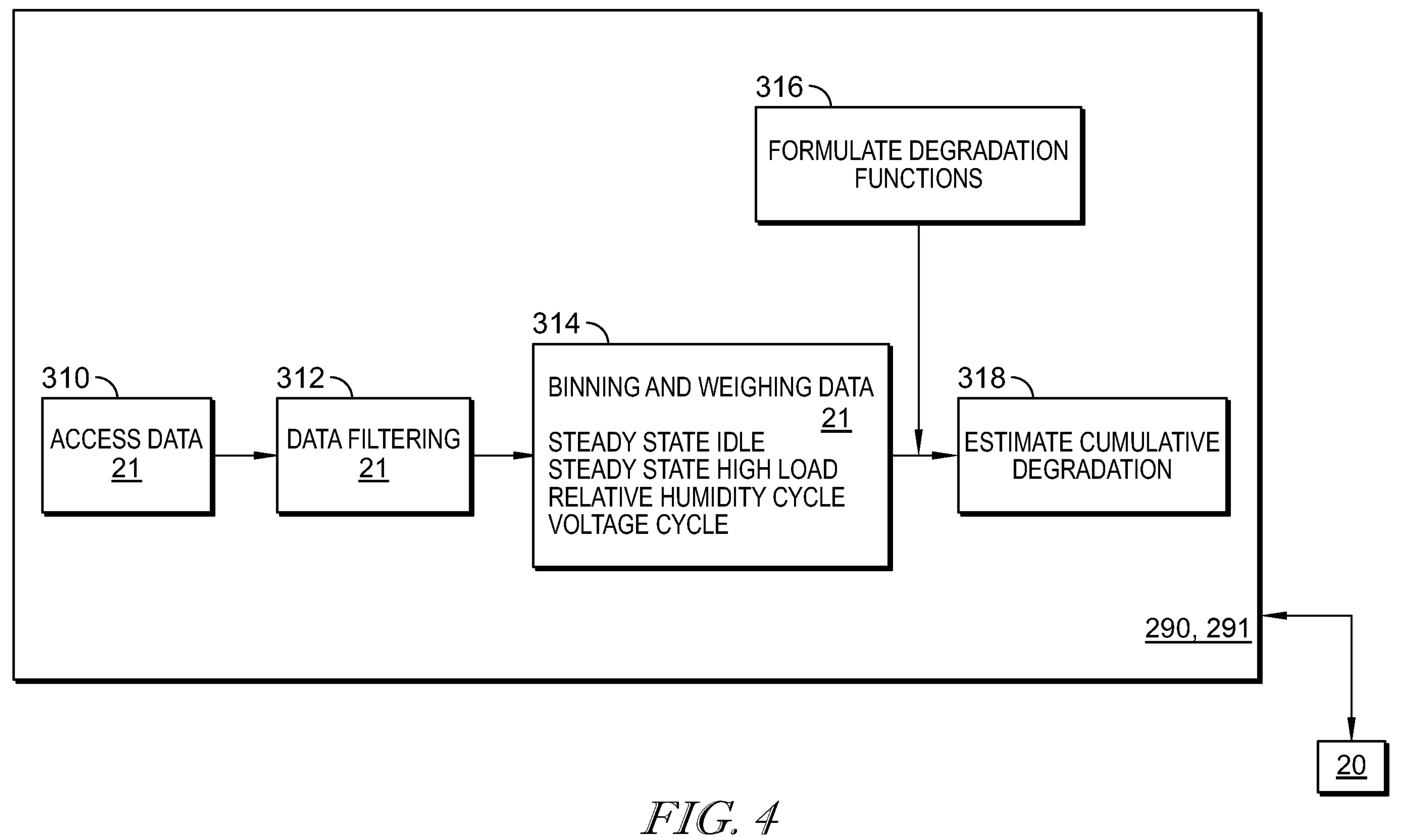
FIG. 4 illustrates a method of determining age of the fuel cell that includes the controller characterizing parameters that influence fuel cell aging.

Referring back to FIG. 2, step 140 of determining age of the fuel cell 20 comprises estimating the cumulative degradation of the age of the fuel cell 20 step 318 of FIG. 4 and including the estimated degradation of the fuel cell age in the global age counter 144. The cumulative degradation of the fuel cell 20 determined in step 140, information about bad channels 132 determined in step 130, and information about bad or weak fuel cells 134 determined in step 130 are used as inputs to track the state of health (SOH) of the fuel cell stack 12 in step 150, as shown in FIG. 2. The controller 290 tracks the state of health of the fuel cell stack 12 in step 150 by identifying output performance parameters. The output performance parameters may include, but are not limited to polarization curves and IQR variance vs. current density curves. The output performance may include tracking exponentially weighted moving averages.

Tracking the state of health of a fuel cell stack 12 in step 150 may also include the controller 290 identifying and measuring the output performance parameters and compensating the measured output performance parameters based on the operating state of the fuel cell system 10. For example, binning may be performed with respect to current density and may require compensation based on the bin's midpoint value. Additionally or alternatively, the output performance parameters identified in step 150 may be compensated for off-nominal pressure occurrences while maintaining relative humidity in the fuel cell system 10. Additionally or alternatively, the output performance parameters identified in step 150 may compensate for other off-nominal factors, including but not limited to temperature and relative humidity measurements that may vary from their steady state measurements. The output performance parameters identified in step 150 may also be compensated for by the cumulative degradation estimated in step 318 (FIG. 4).

The controller 290 can track bad channels 132, bad or weak fuel cells 134, and/or the age of the fuel cell 20 directly or through the global age counter 144. The identification of bad channels 132 and bad or weak fuel cells 134 may be correlated to other variables, such as temperature and/or pressure of the fuel cell 20. Additionally, decisions about the health of the fuel cells 20 in the fuel cell stack 12 may be based on a predetermined fault count threshold and/or a reset count threshold. For example, if a counter tracking the number of instances a given fuel cell 20 is determined to be a bad channel 132 increases above the predetermined fault count threshold, the controller 290 may set the fuel cell 20 as a "fault." Similarly, the counter may count down toward zero at every instance the fuel cell 20 is no longer being detected as a bad channel 132. Once the counter decreases below the reset count threshold, the controller 290 may reset that given fuel cell 20 as having "no fault." In some embodiments, the controller 290 may count down adjacent fuel cells 20 together when determining the health of the fuel cells 20.

In some embodiments, the predetermined fault count threshold may range from about 8 to about 15, including any number of count comprised therein. For example, when the fuel cell 20 is detected as a bad channel ten (10) times, and the predetermined fault count threshold is 10, the fuel cell 20 is set as or determined to be a "fault" and/or a bad channel 132. When the fuel cell 20 is detected as a bad channel ten (10) times, and the predetermined fault count threshold is 15, the fuel cell 20 is not set or counted as a "fault" and/or a bad channel 132.

The reset count threshold may be lower than, equal to, or larger than the predetermined fault count threshold. In an exemplary embodiment, the reset count threshold is larger than the predetermined fault count threshold. In some embodiments, the reset count threshold is about one (1) to about 20 times larger than the predetermined fault count threshold, including any number or range of times comprised therein.

Referring back to FIG. 2, the controller 290 performs a state of health assessment of the fuel cell stack 12 in step 160. A fraction of life of the fuel cell stack 12 corresponding to remaining life of the fuel cell stack 12 is determined in step 160 based on the output performance parameters (e.g., polarization curves and/or IQR variance) determined in step 150. The controller 290 uses the output performance parameters identified in step 150 and the bad channels 132, bad or weak fuel cells 134, and/or the fraction of life of the fuel cell stack 12 determined in step 160 to further determine the state of health of the fuel cell stack 12 and provide a prognostic analysis in steps 170, 180, and 290.

The controller 290 can determine the state of health of the fuel cell stack 12 by measuring and comparing output performance parameters, such as cell voltage and IQR variance to expected values. Expected values are predetermined values of similar output performance parameters of the fuel cell 20 or stack 12 as defined or outlined by manufacturer's specifications based on age and/or utility of the system. The controller 290 may use expected values based on look-up tables, experimental data, maps, and/or other sources to make this determination of the SOH of the fuel cell 20 or fuel cell stack 12. The controller 290 can diagnose and/or compensate for a bad or weak fuel cell 134 or for an off-nominal voltage measurement (i.e., from a bad channel 134).

If the fuel cell stack 12 is determined to be healthy in step 170, the controller 290 can calculate and project the rate of aging of the fuel cells 20 in the fuel cell stack 12, determine the IQR variance and/or send out one or more appropriate system alerts 197. If the fuel cell stack 12 is determined to be marginally healthy in step 180, the controller 290 can adjust one or more control targets to try to recover, improve the performance of the fuel cell stack 12 and/or send out an appropriate system alert 197. The controller 290 may adjust control targets, such as anode excess fuel ratio, cathode humidity, cathode pressure, cathode temperature, and/or cathode excess air ratio. These control target changes may be allowed to vary over time and retained in long term memory by the controller 290. When the fuel cell 20 or fuel cell stack 12 is determined to be degraded in step 190, the controller 290 may regenerate the fuel cell stack 12, actively diagnose the fuel cell system 10, and/or send out an appropriate system alert 197. Fuel cell degradation may be determined by and/or due to the degradation or poor operational performance of a fuel cell catalyst, excessive fuel cell usage, and/or voltage or humidity oscillations.

The alert 197 may be a visual and/or an audio signal recognizable by a user or an operator. For example, the alert may be a unique sound, a color indicator, and/or a message sent to the user. The alert 197 may result in the user evaluating the operation of the fuel cells system 10, repairing the fuel cell system 10, restarting the fuel cell system 10, shutting down the fuel cell system 10, and/or replacing the fuel cell system 10. Alternatively or additionally, the alert 197 may be direct the user or operator to the evaluation, repair, replacement, restart, and/or shutdown of a specific fuel cell stack 12 and/or a specific fuel cell 20 in the fuel cell system 10. In some embodiments, the issuance of the alert 197 may result in an automatic repair, restart, and/or replacement of a fuel cell 20 or fuel cell stack 12 in the fuel cell system 10 that may occur in real-time.

The one or more controllers 290 for monitoring and/or controlling the components in the fuel cell system may be implemented, in some cases, in communication with hardware, firmware, software, or any combination thereof present on or outside the in the fuel cell system 10 including the fuel cell 20 or fuel cell stack 12. The one or more controller 290 for monitoring and/or controlling the physical or virtual sensors used in the fuel cell system 10 may be implemented, in some cases, in communication with hardware, firmware, software, or any combination thereof present on or outside the in the fuel cell system 10 including the fuel cell 20 or fuel cell stack 12. Information may be transferred to the one or more controllers 290 using any one or more communication technology (e.g., wired or wireless communications) and associated protocols (e.g., Ethernet, InfiniBand®, Wi-Fi®, Bluetooth®, WiMAX, 3G, 4G LTE, 5G, etc.) to effect such communication.

The one or more controllers 290 may be in a computing device. The computing device may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The computing device may include one or more of an input/output (I/O) subsystem, a memory, a processor 291, a data storage device, a communication subsystem, and a display that are connected to each other or are in communication with each other through wired, wireless and/or power line connections and associated protocols (e.g., Ethernet, InfiniBand®, Bluetooth®, Wi-Fi®, WiMAX, 3G, 4G LTE, 5G, etc.). The computing device may also include additional and/or alternative components, such as those commonly found in a computer (e.g., various input/output devices). In other embodiments, one or more of the illustrative computing device of components may be incorporated in, or otherwise form a portion of, another component. For example, the memory, or portions thereof, may be incorporated in the processor 291.

The processor 291 may be embodied as any type of computational processing tool or equipment capable of performing the functions described herein. For example, the processor 291 may be embodied as a single or multi-core processor(s), digital signal processor, microcontroller, or other processor or processing/controlling circuit. The memory may be embodied as any type of volatile or non-volatile memory or data storage capable of performing the functions described herein.

In operation, the memory may store various data and software used during operation of the computing device such as operating systems, applications, programs, libraries, and drivers. The memory may be communicatively coupled to the processor 291 via the I/O subsystem, which may be embodied as circuitry and/or components to facilitate input/output operations with the processor 291, the memory, and other components of the computing device.

For example, the I/O subsystem may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

In one embodiment, the memory may be directly coupled to the processor 291, for example via an integrated memory controller hub. Additionally, in some embodiments, the I/O subsystem may form a portion of a system-on-a-chip (SoC) and be incorporated, along with the processor 291, the memory, and/or other components of the computing device, on a single integrated circuit chip (not shown).

The data storage device may be embodied as any type of device or devices configured for short-term or long-term storage of data such as, for example, memory devices and circuits, memory cards, hard disk drives, solid-state drives, or other data storage devices. The computing device also includes the communication subsystem, which may be embodied as any communication circuit, device, or collection thereof, capable of enabling communications between the computing device and other remote devices over the computer network.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of assessing health of a fuel cell stack comprising:

collecting operating data from one or more fuel cells of the fuel cell stack, determining trust in the collected operating data, processing the operating data to identify a bad channel or a weak fuel cell in the fuel cell stack, wherein the bad channel is a fuel cell whose voltage cannot be accurately detected while the weak fuel cell is a fuel cell unable to produce high voltage for tracking state of health of the fuel cell stack, determining an age of a fuel cell in the fuel cell stack by an age counter, a controller characterizing parameters that influence fuel cell aging, assessing duty cycle data or real-time data, filtering the duty cycle data or real-time data, weighting the duty cycle data or real-time data, formulating degradation functions, or estimating cumulative degradation of the fuel cell, wherein weighting the duty cycle data or real-time data comprises using a binning strategy based on steady state conditions, dry and wet cycles, or voltage cycles, assessing the health of the fuel cell stack, and alerting a user about the health of the fuel cell stack.

2. The method of claim 1, comprising identifying the bad channel by determining a difference in voltage measurements between adjacent fuel cells and comparing the difference to an average cell voltage measurement (CVM).

3. The method of claim 1, comprising identifying the bad channel based on statistics of fuel cell voltage distribution, voltage spread increase under transient conditions, assessment of individual fuel cell weakness on a continuum, identifying outliers, inner and outer interquartile range (IQR) thresholds, or behavioral signatures or patterns.

4. The method of claim 1, comprising the controller implementing a validity check to ascertain the identification of the bad channel, wherein the validity check comprises determining that cell voltage monitor (CVM) measurements are within a range of about 0.25 V to about 1.1 V or that a difference between the CVM mean and a stack voltage measurement is about 0.02 V after excluding large outliers.

5. The method of claim 1, wherein estimating cumulative degradation of fuel cells comprises the controller using transfer functions.

6. The method of claim 1, wherein the cumulative degradation of the fuel cell and the identification of the bad channel or the weak fuel cell is an input in tracking the state of health of the fuel cell stack.

7. The method of claim 1, wherein tracking the state of health of the fuel cell stack comprises the controller determining output performance parameters of the fuel cell stack and compensating the output performance parameters based on a fuel cell stack operating state.

8. The method of claim 7, wherein compensating for the fuel cell stack operating state comprises compensating for off nominal pressure occurrences while maintaining relative humidity in the fuel cell stack, compensating for temperature, or compensating for relative humidity.

9. The method of claim 7, wherein determining the output performance parameters comprises determining a polarization curve or inter quartile range (IQR) variance, and utilizing a binning strategy with respect to current density.

10. The method of claim 1, wherein assessing the health of the fuel cell stack comprises providing a prognostic analysis based on expected values of the fuel cell stack.

11. The method of claim 10, wherein providing the prognostic analysis is based on a polarization curve or an interquartile range (IQR) variance.

12. The method of claim 10, wherein assessing the health of the fuel cell stack comprises the controller determining the fuel cell stack to be healthy and calculating a projected rate of aging of the fuel cells in the fuel cell stack.

13. The method of claim 10, wherein assessing the health of the fuel cell stack comprises the controller determining the fuel cell stack to be marginally healthy and adjusting a control target to recover fuel cell stack performance or adjusting anode excess fuel ratio, cathode humidity, cathode pressure, cathode temperature, or cathode excess air ratio.

14. The method of claim 10, wherein assessing the health of the fuel cell stack comprises the controller determining the fuel cell stack to be degraded and regenerating the fuel cell stack.

15. The method of claim 1, wherein assessing the health of the fuel cell stack comprises comparing output performance parameters determined by tracking the state of health of the fuel cell stack to an expected value based on look-up tables, experimental data, or maps.

16. The method of claim 1, wherein assessing the health of the fuel cell stack comprises the controller diagnosing or compensating for the weak fuel cell or the bad channel.

17. The method of claim 1, wherein the operating data includes stack voltage data or cell voltage monitoring data.

18. A method of assessing health of a fuel cell stack comprising:

collecting operating data from one or more fuel cells of the fuel cell stack, determining trust in the collected operating data, processing the operating data to identify a bad channel or a weak fuel cell in the fuel cell stack, wherein the bad channel is a fuel cell whose voltage cannot be accurately detected while the weak fuel cell is a fuel cell unable to produce high voltage for tracking state of health of the fuel cell stack, assessing the health of the fuel cell stack, and alerting a user about the health of the fuel cell stack, wherein tracking the state of health of the fuel cell stack comprises a controller determining output performance parameters of the fuel cell stack by determining a polarization curve or inter quartile range (IQR) variance, and utilizing a binning strategy with respect to current density, and by compensating the output performance parameters based on a fuel cell stack operating state.

19. The method of claim 18, comprising identifying the bad channel by determining a difference in voltage measurements between adjacent fuel cells and comparing the difference to an average cell voltage measurement (CVM).

20. The method of claim 18, comprising the controller implementing a validity check to ascertain the identification of the bad channel, wherein the validity check comprises determining that cell voltage monitor (CVM) measurements are within a range of about 0.25 V to about 1.1 V or that a difference between the CVM mean and a stack voltage measurement is about 0.02 V after excluding large outliers.

* * * * *